United States Patent [19]

Hentges

[11] Patent Number: 4,902,766

[45] Date of Patent: Feb. 20, 1990

[54] LIQUID ALIPHATIC RESINS

[75] Inventor: Steven G. Hentges, Baton Rouge, La.

[73] Assignee: Exxon Chemical Patents Inc., Linden, N.J.

[21] Appl. No.: 936,409

[22] Filed: Dec. 1, 1986

[51] Int. Cl.$^4$ .............................................. C08F 36/04
[52] U.S. Cl. ..................................... 526/290; 526/237; 526/339; 526/76; 585/508
[58] Field of Search ............ 526/237, 290, 339, 340.2, 526/76; 585/18, 508, 510

[56] References Cited

U.S. PATENT DOCUMENTS

| | | | |
|---|---|---|---|
| 3,692,756 | 9/1972 | St. Cyr | 526/339 |
| 3,784,530 | 1/1974 | Osborn | 526/339 |
| 3,865,797 | 2/1975 | Joy | 526/237 X |
| 4,038,346 | 7/1977 | Feeney | 526/339 |
| 4,060,503 | 11/1977 | Feeney | 526/339 |
| 4,098,983 | 7/1978 | Osborn | 526/339 |
| 4,157,363 | 6/1979 | Hepworth | 526/237 X |
| 4,230,842 | 10/1980 | Bullard | 526/339 |
| 4,358,574 | 11/1982 | Hughes | 526/339 |
| 4,391,961 | 7/1983 | Small | 526/290 |
| 4,677,176 | 6/1987 | Evans et al. | 526/290 |

*Primary Examiner*—Joseph L. Schofer
*Assistant Examiner*—F. M. Teskia
*Attorney, Agent, or Firm*—J. F. Hunt

[57] ABSTRACT

A light color aliphatic hydrocarbon petroleum resin including a piperylene component and a chain transfer agent component useful as a tackifying agent, especially with copolymers. The resin of the invention has a softening point of about 0°–40° C., a number average molecular weight of from 100 to about 900, a low Gardner color of about 3 or less, and is formed by the aluminum chloride catalyzed polymerization of a feed stream essentially free of butadiene.

14 Claims, No Drawings

LIQUID ALIPHATIC RESINS

This invention relates to hydrocarbon petroleum resins having excellent tackifying properties in adhesives and in particular to such resins having a light color and a softening point in the liquid range of about 0° to 40° C.

BACKGROUND OF THE INVENTION

Adhesives form a large part of daily activity for everyone, whether in the form of tape used to close a package or secure items together, bandages, envelopes, notepads, diaper tabs or any one of many other products in common use. The key requirements for adhesives are that they should have suitable cohesive and adhesive properties at end use conditions and during application, whether by solvent or bulk casting. Usually these adhesives are prepared from a mixture of resin, copolymer and a plasticizer to soften the adhesive and enhance tack.

Adhesives prepared from blends incorporating these polymers have very good adhesive and strength properties at room temperature and can be processed by conventional melt coating and extrusion techniques because of their good flow characteristics. However, when copolymers are mixed with tackifying resins in order to form adhesives, many requirements and factors are important such as the ease with which the resin is blended with the copolymer and the control of the tack as well as the long term properties of the adhesive. Further, the adhesives industry has increased the demand for low softening point resins and market requirements dictate the desirability of resins which are not only liquid, i.e., softening point about 40° C. or less, but that are light in color, even a Gardner color of less than about 3. However, a resin would be considered to be sufficiently light in color for some applications with a Gardner color of 6 or even 7.

Many attempts have been made to prepare resins having these properties for use in the blending with copolymers to form adhesives, but all have fallen short of the mark in one respect or another.

Other attempts have been made to prepare light color, low softening point aliphatic resins including, for example, the disclosure of U.S. Pat. Nos. 3,813,357; 3,692,756; 3,661,870; 3,804,788; 3,853,826; 3,872,064; 4,098,983; 4,038,346; 4,153,771; and 4,189,547.

Petroleum hydrocarbon resins may be obtained by polymerizing, using a Friedel-Crafts catalyst, a petroleum resin feed comprising $C_5$ and $C_6$ olefins and diolefins obtained from the cracking of petroleum feedstock and usually subjected to thermal soaking at about 100° to 150° C., a branched chain reactive aliphatic olefin chain transfer agent, and optionally a $C_8$ to $C_{10}$ vinyl aromatic compound. The reactive olefin transfer agents are feed additives which in part control the resin molecular weight and narrow the resin molecular weight distribution.

Most aliphatic resins do not provide desired adhesive properties with many copolymers. Other components such as a naphthenic oil are required to impart the tack or other requisite adhesive properties to the adhesive composition. The presence of oil itself can cause detrimental adhesive performance. The low color liquid resins of the present invention solve these problems of the prior art.

Most of the patents mentioned above also relate to the preparation of aliphatic or liquid resins using various feedstocks but preparing the resin by boron trifluoride catalyzed polymerization. It is well established that polymerization with $BF_3$ results in a substantially different polymer than that which is obtained by aluminum chloride Freidel-Crafts polymerization. U.S. Pat. No. 3,853,826 at column B 1, lines 32–36 presents a brief discussion of the structural differences between $BF_3$ and aluminum chloride catalyzed resins. U.S. Pat. No. 4,098,983 discloses that the $BF_3$ polymerization of a piperylene/2-methylbutene feed provides a low softening point resin having a high viscosity. In the same disclosure at column 4, Examples 1 and 2 teach that a similar polymerization with aluminum chloride results in high softening point resins, contrary to the present invention.

U.S. Pat. No. 3,692,756 discloses the production of liquid resins and hard resins from blends of $C_4$ and $C_5$ olefins and diolefins with aluminum chloride catalysts. This reference teaches the requirement of the presence of a significant portion of butadiene to obtain a liquid resin. In Examples 2 and 5 using low levels of butadiene, a high softening point resin is obtained.

U.S. Pat. No. 3,661,870 describes the production of liquid resins derived from butadiene and chain transfer agents with aluminum chloride as catalyst. While piperylene is a possible low level additive, butadiene is required in significant amount.

SUMMARY OF THE INVENTION

The present invention is a liquid aliphatic hydrocarbon resin of light color prepared from piperylene and a chain transfer agent. The resin, containing little or no vinyl aromatic hydrocarbon component and essentially no butadiene component, is especially useful as a tackifier in pressure sensitive adhesives. Accordingly, liquid resins of low Gardner color are prepared from a high concentration of chain transfer agent and a signficant portion of piperylene. The resins have low molecular weight and softening point in addition to a low cloud point and narrow molecular weight distribution.

Tackifying resins for use in the manufacture of adhesives and having a softening point in the liquid range are polymerized using an aluminum chloride Freidel-Crafts catalyst. The resins are prepared by the catalytic reaction of a petroleum resin feed being predominantly a piperylene diolefin feedstock from steam cracked naphtha or light refinery streams, especially piperylene concentrates or heat soaked piperylene fractions. A chain transfer agent forms the other significant portion of the hydrocarbon feed stream.

DESCRIPTION OF THE PREFERRED EMBODIMENTS

A preferred embodiment of the present invention is a petroleum hydrocarbon resin suitable for use as a tackifier in an adhesive composition, said resin having a softening point of about 0°–40° C., number average molecular weight, Mn of about 100–900, Gardner color of 6 or less, and a piperylene-derived content of about 5–50 weight percent, said resin being prepared by the aluminum chloride catalyzed Friedel-Crafts polymerization of a hydrocarbon feed comprising:

(a) less than 5 weight percent vinyl aromatic hydrocarbons;
(b) less than 1 weight percent butadiene;
(c) about 10–90 weight percent piperylene stream; and (d) about 90–10 weight percent monoolefin chain transfer agent stream.

Another preferred embodiment of the present invention is an aluminum chloride-catalyzed petroleum hydrocarbon resin consisting essentially of about 5–40 weight percent piperylene and chain transfer agent, said resin having a softening point of 15°–30° C., a Gardner color of 3 or less, a number average molecular weight Mn of about 400–700, and a molecular weight distribution of from 1.25–1.35.

The resins of this invention are attractive and functional for use in adhesives since they have both a low softening point and light color in addition to good tack and high compatibility with ethylene vinyl acetate and other copolymers, both block and random. Furthermore, the resins of the present invention are especially functional for use in the pressure sensitive adhesive applications.

In practicing the invention to produce the novel liquid hydrocarbon resins which have been found to provide tackification in many copolymer blends and pressure sensitive adhesives, the feedstock composition is important in order to obtain resins possessing requisite molecular weight and distribution, softening point, and preferred color for a particular use. While the reaction conditions are also important, they may be varied somewhat. The resins of the invention have softening points of from 0°–40° C., preferably 15°–30° C., more preferably about 20° C., and Gardner colors of 6 or less, preferably 3 or less, most preferably about 1–2. The resins are formed from a feed wherein the predominant reactive components are, under aluminum chloride polymerization, piperylene and a monoolefinic chain transfer agent.

Preferably, each of the chain transfer agent stream and the piperylene stream form about 10–90 weight percent of the polymerizable hydrocarbon feed. A piperylene concentrate or substantially pure/100% piperylene may be used. The concentrate may contain as little as 10% piperylene based on the weight of the concentrate. Preferably, the piperylene concentrate is a heat soaked piperylene concentrate. Such concentrates include from about 5–95 weight percent piperylene based on the weight of the concentrate, preferably about 20–70 weight percent, more preferably about 30–50 weight percent. Such a piperylene concentrate typically results from the isolation of a fraction of steam cracked petroleum hydrocarbons which boil between about 20° C. and 140° C., such a fraction containing diolefins substantially below the 9 carbon atom level.

The heat soaked piperylenes are well known and described in U.S. Pat. No. 4,391,961 which is incorporated herein in its entirety for all purposes. Such heat soaked piperylene concentrates impart a lower color to the resulting resins. The concentrates, while containing hydrocarbons which do not enter into the resin-forming reaction, are nevertheless valuable for forming low color liquid resins. The nonreactive materials normally do no harm to the resins and, during reaction, act as a diluent which is removed after resin is recovered.

The monoolefinic chain transfer agent stream of the present invention usually contains $C_4$–$C_8$ monoolefins, preferably of the general formula $RR'C=CR''R'''$ where R and R' are $C_1$ to $C_5$ alkyl, and R'' and R''' are H or a $C_1$–$C_4$ alkyl group. Useful chain transfer agents include isobutene, isoamylenes, isohexenes and diisobutenes. The particularly useful isoamylenes are described in U.S. Pat. No. 4,514,554 which is incorporated herein by reference in its entirety for all purposes. The chain transfer agents are usually concentrates or mixtures containing various desired isomers from distillation cuts, well known to those skilled in the art. Mixtures may also be prepared from pure compounds. Also known and useble are substantially pure isoolefins (e.g., isobutylene or isoamylene). Also useful are longer chain monoolefins other than those of $C_4$–$C_8$ but having the formula $RR'C=CR''R'''$.

The chain transfer agent stream of the invention may be any of the substantially pure or concentrated streams described herein or known to the skilled artisan. The chain transfer agent stream comprises 10–90 weight percent of the hydrocarbon feed of the aluminum chloride catalyzed Friedel-Crafts polymerization of the invention. Preferably, the chain transfer agent stream of the hydrocarbon feed contains sufficient chain transfer agent so that the chain transfer agent comprises about 10–50 weight percent of the hydrocarbon feed.

Where a chain transfer agent stream is a concentrate, it preferably contains 20–100% chain transfer agent, more preferably 30–100%. It is recognized that high purity chain transfer agent streams, where available, require less processing throughput than low purity streams since fewer nonreactants are present.

Various hexene and other $C_6$ compositions are also useful. A particularly useful chain transfer agent for preparation of resins according to the invention contains isohexene isomers resulting from the dimerization of propylene in the well known "Dimersol" process which uses a nickel coordination complex and an aluminum alkyl as the catalyst system. The process is capable of converting propylene to hexenes with a selectivity in excess of 85%. The Dimersol® dimerization process has been referred to in various publications including "How First Dimersol Is Working" by Benedek et al., Hydrocarbon Processing, May 1980, Page 143; as well as in "The IFP Dimersol® Process For the Dimerization of $C_3$ and $C_4$ Olefinic Cuts" by Chauvin et al., Advances in Petroleum Technology presented at the American Institute of Chemical Engineers, Apr. 13, 1976, Kansas City, Mo.

Thus, a preferred chain transfer agent according to the invention is that product stream obtained from the selective dimerization of propylene with a transition metal catalyst. This dimerization stream even as a crude product has been discovered to perform as a satisfactory chain transfer agent. This chain transfer agent is characterized as having medium chain length ($C_6$–$C_9$) olefins derived from a selective dimerization of proplene. By selective, we mean that the process normally converts propylene to a mixture of hexenes with a selectivity of about 85%. The chain transfer agent is characterized by being composed mainly of internal olefins, having a linear content of from about 20% to 32% by weight. The main reactive isomer present is 2-methyl-2-pentene, along with other 2- and 4-methylpentenes and around 6% 2,3-dimethyl-2-butene. It is known that certain of these hexenes, particularly the linear species and those such as the 4-methyl-2-pentene species do not function as a chain transfer agent and are generally unreactive in the polymerization reaction. Higher molecular weight reaction products such as a $C_9$ olefin are usually present in amounts of about 12–18 weight percent. Usually chain transfer agents comprise only about one-third of the stream (by weight).

To illustrate the species included in a product stream obtained from the above mentioned selective dimerization of propylene, a typical analysis follows:

| Component | Weight % |
| --- | --- |
| 4-Methyl-1-pentene | 1.2 |
| 2,3-Dimethyl-1-butene | 2.8 |
| cis-4-Methyl-2-pentene | 3.9 |
| trans-4-Methyl-2-pentene | 25.2 |
| 2-Methyl-1-pentene | 3.9 |
| trans-3-Hexene | 3.9 |
| trans-2-Hexene | 10.6 |
| 2-Methyl-2-pentene | 25.8 |
| cis-2-Hexene | 4.7 |
| 2,3-Dimethyl-2-butene | 2.7 |
| unknown | 1.1 |
| $C_9$ | 14.2 |

The selective dimerization of propylene not only results in a product which is a useful chain transfer agent but also imparts very narrow molecular weight distribution, good color, and good end use properties to the formed resins.

Depending upon the dimerization process reaction conditions, the useful mixtures of the selective dimerization of propylene may vary. The hexene fraction may be distilled to remove propylene trimer and provide a distribution of hexenes as shown below:

| Hexane Distribution from Propylene Dimerization | |
| --- | --- |
| Component | Range Weight % |
| 4-Methyl-1-pentene | 0.5-2 |
| 2,3-Dimethyl-1-butene | 1-4 |
| cis-4-Methyl-2-pentene | 2.5-5 |
| trans-4-Methyl-2-pentene | 15-30 |
| 2-Methyl-1-pentene | 4-6 |
| trans-3-Hexene | 4-7 |
| trans-2-Hexene | 12-18 |
| 2-Methyl-2-pentene | 25-40 |
| cis-2-Hexene | 4-7 |
| 2,3-Dimethyl-2-butene | 3-7 |

Although pure compounds and isomers making up the previously mentioned monoolefin chain transfer agent streams are useful, it is within the scope of the present invention to use mixtures of isomers and reaction products containing such isomers in the practice of the invention, with the isohexenes produced by selective dimerization being preferred.

The polymerization reaction is carried out by bringing the hydrocarbon mixture into contact with a catalyst containing aluminum chloride, anhydrous aluminum chloride being preferred. The catalyst is preferably used in a particulate form with a particle size in the range of about 5-200 mesh although larger or smaller particles may be used. The amount of catalyst used ranges from about 0.5-2 weight percent, preferably about 1-2 weight percent although larger amounts may be used without ill effects. The catalyst may be added to the hydrocarbon mixture or an inverse procedure may be used. The reaction can be conducted continuously or by batch process techniques generally known to those skilled in the art.

The reaction may be carried out at any pressure which results in production of a low molecular weight liquid resin from the components of the invention. A suitable range for reaction pressures is 10-80 psi (0.7-5.6 kg/cm$^2$), preferably about 20 psi (1.4 kg/cm$^2$). The reaction temperature may be any suitable range resulting in the polymerization of a resin of suitable molecular weight, low color, and tackifier properties according to the invention from the hydrocarbon feed stream of the invention. A suitable reaction temperature range is about 20°-100° C., preferably 30°-60° C., more preferably about 35°-50° C. The polymerization time usually varies from ¼-2 hours, preferably about 20 minutes to 1 hour.

The reaction is conveniently carried out in the presence of a diluent because the reaction is usually exothermic and the resulting product is viscous. With adequate mixing and cooling, the temperature can be controlled and the reaction may be conducted with only sufficient diluent to maintain good heat transfer from the heat of polymerization. The diluent may be introduced as an integral component of the feed stock streams where concentrates, reaction mixtures, or distillation fractions are used, but various other diluents which are inert in that they do not enter into the polymerization reaction may also be added separately. Representative examples of inert diluents are aliphatic hydrocarbons such as pentane, hexane, heptane, and nonreactive aromatic hydrocarbons such as xylene, toluene, and benzene as well as unreacted residual hydrocarbons from the reaction.

After polymerization is complete, the catalyst is quenched by well known means, usually addition of water and alcohol solution followed by resin recovery. The recovery step is usually carried out by heating to about 250° C. to remove unreacted hydrocarbons/diluent (raffinate) followed by steam stripping to remove low molecular weight oligomers (fill). The degree of stripping can be varied somewhat as desired to make small adjustments to the softening point. The raffinate removed may be saved and used as diluent for subsequent polymerizations.

The resins of the invention contain and are formed from hydrocarbon feed streams containing little or no reactive aromatic hydrocarbons, preferably less than 5 weight percent aromatic hydrocarbons. Typical diluent aromatic hydrocarbons such as toluene and benzene do not react in the polymerization process. Vinyl aromatic hydrocarbons and similar reactive species do not form a significant portion of the resin of the present invention and their presence in the hydrocarbon feed stream is minimized.

The resins of the present invention are based on piperylene and not butadiene. Accordingly, the resins contain essentially no butadiene component and the hydrocarbon feed stream contains little or no butadiene, preferably less than 1 weight percent butadiene.

The monoolefinic chain transfer agent of the hydrocarbon feed stream for preparing the resin of the invention is preferably present in about 10-50 weight percent based on the total weight of the feed stream. Also preferably, at least about 40-70 weight percent of the resin is formed of this chain transfer agent component and accordingly the feed stream preferably contains such a proportion. In some embodiments of the resin of the invention, up to about 30 weight percent may be derived from olefins other than piperylene and chain transfer agents.

The resins of the invention are liquid having a softening point as determined by ASTM Method E-28 modified for liquid resins. A preferred and more useable softening point range is 15°-30° C. Still more preferred is about 20° C.

The resins of the invention have a Gardner color of 6 or less, preferably 3 or less, and most preferably about 1–2. The light colors of the resins of the invention are highly desirable since industry demands low Gardner color resins for applications in pressure sensitive adhesives and the products where adhesive compositions are used.

The resins of the invention have a number average molecular weight Mn of about 100–900, preferably about 400–700, more preferably about 500. The resins have a weight average molecular weight of about 100–900, preferably about 500–800, more preferably about 700. The molecular weight distribution may vary accordingly but is preferably about 1.25 to 1.35.

The light color liquid aliphatic resins of the invention can readily be prepared from the foregoing description and the following examples. Those skilled in preparing adhesives from petroleum hydrocarbon resins will be able to incorporate same with copolymer and in pressure sensitive adhesive compositions. The invention is further described by the following examples which are offered by way of explanation and for the purpose of guiding those skilled in the art to practice the invention and the broadening of its usefulness and not for purposes of limitation.

EXAMPLES 1–6

The aliphatic liquid resins of these examples were polymerized batchwise using aluminum chloride as catalyst in a nitrogen atmosphere at about 10 psig (0.7 kg/cm$^2$). The aluminum chloride catalyst of particle size 5–200 mesh was added in anhydrous form and 400 grams of the feedblends in the proportions indicated in Table 1 were pumped into the closed, stirred reactor containing the catalyst over a period of 30 minutes. The reaction mixtures were left in contact with the catalyst for an additional 30 minutes with stirring. Thereafter, a 400 gram 1:3 solution of isopropanol:water was added to the reaction mixture to quench the catalyst and the polymerizate was water washed 2 to 3 additional times with the aqueous phase being separated after each wash.

The resin recovery step was carried out by heating to 250° C. with a nitrogen sparge to remove raffinate followed by stream steam stripping to remove fill and produce the finished resin. In Examples 1–6, the following heat soaked piperylene concentrate was used:

| Piperylene Concentrate | Weight Percent |
|---|---|
| 1-Pentene | 2.5 |
| cis and trans 2-Pentene | 6.5 |
| 2-Methyl-1-butene | 0.2 |
| 2-Methyl-2-butene | 3.7 |
| Cyclopentene | 17.4 |
| cis and trans Piperylene | 28.8 |
| Low reactivity olefins and nonreactive paraffins | 40.9 |

In Examples 1–5, a product of the Dimersol ® propylene dimerization process was used as the chain transfer agent and had the composition given below:

| Component | Weight % |
|---|---|
| 2-Methyl-1-pentene | 3.9 |
| 2-Methyl-2-pentene | 25.9 |
| 2,3-Dimethyl-1-butene | 2.8 |
| 2,3-Dimethyl-2-butene | 2.7 |
| Other C$_6$ olefins | 50.5 |
| C$_9$ olefins | 14.2 |

*"Dimate", from Diamond Shamrock, produced by dimerization of propylene.

In Example 6, a UOP hexene stream was used in place of the Dimersol ® process propylene dimer product. The composition of the hexene stream for Example 6 was as given below:

| Component | Weight % |
|---|---|
| 4-Methyl-1-pentene | 0.8 |
| 2,3-Dimethyl-1-butene | 1.6 |
| cis-4-Methyl-2-pentene | 8.9 |
| trans-4-Methyl-2-pentene | 3.1 |
| 2-Methyl-1-pentene | 5.2 |
| 1-Hexene | 0.5 |
| trans-3-Hexene | 2.7 |
| trans-2-Hexene | 5.1 |
| 2-Methyl-2-pentene | 18.2 |
| cis-3-Methyl-2-pentene | 9.1 |
| cis-2-Hexene | 2.2 |
| 2,3-Dimethyl-2-butene | 1.5 |
| trans-3-Methyl-2-pentene | 6.5 |
| Low reactivity olefins and nonreactive paraffins | 34.6 |

The Table gives the reaction conditions and properties of the finished resin for the process described above.

TABLE

| | Liquid Aliphatic Resins | | | | | |
|---|---|---|---|---|---|---|
| Examples | 1 | 2 | 3 | 4 | 5 | 6 |
| Feed Composition, wt. % | | | | | | |
| Chain Transfer Agent Stream | 75 | 65 | 65 | 60 | 60 | 65 |
| Piperylene Concentrate | 25 | 35 | 35 | 40 | 40 | 35 |
| Polymerization | | | | | | |
| AlCl$_3$ Catalyst, wt. % (1) | 1 | 1.5 | 1.5 | 1.2 | 1.0 | 1.2 |
| Reactor Temperature, °C. | 40 | 40 | 40 | 40 | 40 | 40 |
| Reactor Pressure, psig | 10 | 10 | 10 | 10 | 10 | 10 |
| Finishing | | | | | | |
| Resin Yield, % | 20.5 | 30.7 | 25.0 | 32.5 | 27.0 | 26.0 |
| Fill Yield, % | 3.1 | 0 | 3.0 | 3.2 | 1.8 | 0 |
| Raffinate, % | 76.9 | 69.3 | 72.0 | 64.3 | 71.2 | 74.0 |
| Resin Properties | | | | | | |
| Softening Point, °C. | 21.5 | 18.5 | 32.5 | 31 | 44 | 20 |
| 20/40/40 Cloud Point, °C. (2) | 64 | 66 | 66 | 65 | 66 | 66 |
| Gardner Color (3) | 3− | 1+ | 1+ | 2+ | 2+ | 3 |
| GPC Molecular Weight (4) | | | | | | |
| Mn | 525 | 563 | 490 | 496 | 518 | — |
| Mw | 685 | 750 | 638 | 654 | 678 | — |
| Mw/Mn | 1.31 | 1.33 | 1.30 | 1.32 | 1.30 | — |

(1) Slurried in benzene (5%).
(2) The temperature at which there is an appearance of haze or "cloud" in a mix of 40 parts 60° C. meltpoint paraffin wax, 20 parts Escorene ® UL7750 (ethylene vinyl acetate, 28% vinyl acetate) from Exxon Chemical Company and 40 parts test resin heated to 200° C. and allowed to cool in air with stirring.
(3) 50% in toluene with comparator discs.
(4) Polyisobutylene standard.

The foregoing disclosure and description of the invention are illustrative and explanatory. Various changes in the process and materials as well as the details of the illustrated examples are permissible without departing from the scope or spirit of the invention which is defined by the appended claims.

We claim:
1. A petroleum hydrocarbon resin suitable for use as a tackifier in an adhesive composition, said resin having a softening point of about 0°–40° C., a number average molecular weight Mn of about 100 to 900, a Gardner color of 6 or less, and a piperylene-derived content of about 5–50 weight percent, said resin being prepared by the aluminum chloride catalyzed Friedel-Crafts polymerization of a hydrocarbon feed comprising:

(a) less than about 5 weight percent vinyl aromatic hydrocarbons;
(b) less than 1 weight percent butadiene;
(c) about 10–90 weight percent piperylene stream; and
(d) about 90–10 weight percent monoolefin chain transfer agent stream.

2. The resin of claim 1 wherein said monoolefin chain transfer agent is of the formula $RR'=CR''R'''$ where R and R' are $C_1-C_5$ alkyl and R'' and R''' are H or a $C_1-C_4$ alkyl.

3. The resin of claim 1 wherein said chain transfer agent comprises the reaction product stream of medium chain length olefins derived from the selective dimerization of propylene.

4. The resin of claim 3 wherein the propylene is dimerized in the presence of a transition metal catalyst.

5. The resin of claim 3 wherein said dimerization reaction product stream contains from about 12–18 weight percent $C_9$ propylene trimer.

6. The resin of claim 3 wherein the dimerization reaction product chain transfer agent has the following analysis on a $C_9$ trimer-free basis:

| Component | Range Weight % |
| --- | --- |
| 4-Methyl-1-pentene | 0.5–2 |
| 2,3-Dimethyl-1-butene | 1–4 |
| cis-4-Methyl-2-pentene | 2.5–5 |
| trans-4-Methyl-2-pentene | 15–30 |
| 2-Methyl-1-pentene | 4–6 |
| trans-3-Hexene | 4–7 |
| trans-2-Hexene | 12–18 |
| 2-Methyl-2-pentene | 25–40 |
| cis-2-Hexene | 4–7 |
| 2.3-Dimethyl-2-butene | 3–7 |

7. The resin of claim 1 wherein chain transfer agent is present in said hydrocarbon feed at about 10–50 weight percent based on the weight of said hydrocarbon feed.

8. The resin of claim 1 wherein said piperylene stream is a heat soaked piperylene concentrate.

9. The resin of claim 8 wherein said heat soaked piperylene concentrate contains about 20–70 weight percent piperylene based on the weight of said concentrate.

10. The resin of claim 1 wherein said hydrocarbon feed contains less than 1 weight percent vinyl aromatic hydrocarbons.

11. An aluminum chloride-catalyzed petroleum hydrocarbon resin consisting essentially of about 5–40 weight percent piperylene and monoolefin chain transfer agent, said resin having a softening point of 15°–30° C., a Gardner color of 3 or less, a number average molecular weight Mn of about 400 to 700, and a molecular weight distribution of from 1.25 to 1.35.

12. The resin of claim 11 wherein said piperylene component is about 30–40 weight percent of the resin.

13. The resin of claim 12 having a Gardner color of about 1–2.

14. The resin of claim 12 having a softening point of about 20° C., a Mn of about 500–600, and a molecular weight distribution of about 1.3.

* * * * *